US005443897A

United States Patent [19]

Kawaguchi et al.

[11] Patent Number: 5,443,897

[45] Date of Patent: Aug. 22, 1995

[54] ELECTRICALLY CONDUCTIVE DECORATIVE MATERIAL

[75] Inventors: Yoji Kawaguchi; Hirofumi Amano, both of Itami; Satoshi Kashihara, Kawanishi, all of Japan

[73] Assignee: Toyo Linoleum Company Limited, Itami, Japan

[21] Appl. No.: 247,487

[22] Filed: May 23, 1994

Related U.S. Application Data

[63] Continuation of Ser. No. 879,837, May 6, 1992, abandoned, which is a continuation-in-part of Ser. No. 606,970, Oct. 31, 1990, abandoned.

[30] Foreign Application Priority Data

Nov. 7, 1989 [JP] Japan .................................. 1-289052

[51] Int. Cl.[6] ................................................ B32B 5/00

[52] U.S. Cl. .................................... 428/237; 428/227; 428/236; 428/238; 428/239; 428/240; 428/245; 428/247; 428/251; 428/285; 428/400; 428/402

[58] Field of Search ............... 428/227, 236, 238, 239, 428/240, 245, 247, 251, 285, 400, 402

[56] References Cited

U.S. PATENT DOCUMENTS 4,944,998 7/1990 Ko et al. ............................ 428/327

*Primary Examiner*—Patrick J. Ryan
*Assistant Examiner*—Richard Weisberger
*Attorney, Agent, or Firm*—Armstrong, Westerman, Hattori, McLeland & Naughton

[57] ABSTRACT

The present invention provides an electrically conductive decorative material which includes:

(a) a layer of a resin containing an electrically conductive fiber rendering the resin layer electrically conductive, and (b) a plurality of pattern pieces spaced apart one from another and embedded in the resin layer, the pattern pieces containing an antistatic agent, the fiber-containing conductive resin penetrating into and filling interstices between the pattern pieces.

4 Claims, 2 Drawing Sheets

ELECTRICALLY CONDUCTIVE DECORATIVE MATERIAL

This application is a continuation of application Ser. No. 07/879,837 filed May 6, 1992 now abandoned, which was a continuation-in-part of application Ser. No. 07/606,970 filed Oct. 31, 1990, now abandoned.

BACKGROUND OF THE INVENTION

The present invention relates to electrically conductive decorative materials, such as conductive decorative sheets or tiles, suitable as floor materials for use in factories handling ICs, LSIs and like electronic parts, laboratories or operating rooms, various clean rooms, etc.

In order to avoid electrostatic troubles, plastics or rubber floor materials filled with a large quantity of electrically conductive carbon black have heretofore been used in factories handling ICs, LSIs and like electronic parts, laboratories, operating rooms, etc. However, these floor materials, although producing an antistatic effect, have a black surface and are therefore low in decorative effect as interior finishing materials. To overcome this problem, JP-B No. 60-6429 proposes an interior finishing material comprising electrically nonconductive colored pellets and electrically conductive pellets. This material has a decorative effect and exhibits a considerable antistatic effect, whereas the conductive pellets used are black pellets incorporating conductive carbon black, giving a dark color to the material in its entirety. Further when this floor material is used in electronic part factories handling ICs, LSIs or the like, the material is subjected for example, to a voltage of at least 300 V to 10 KV as measured by the Honest Meter method, causing a voltage breakdown of electronic parts. The term, "voltage breakdown" refers to the phenomenon that electric charge stored in the human body, which can be viewed as a capacitor, flows out into an electronic part to break down the part. The voltage breakdown invariably occurs when the charge voltage is at least 100 V. To preclude this, the charge voltage is preferably no more than 50 V, more preferably not greater than 30 V. The known floor material nevertheless has the problem that the charge on the nonconductive pellets is not readily removable but induces a voltage breakdown. Further with the above floor finishing materials wherein conductive carbon black is used, fine particles of carbon black become suspended in the air owing to the wear of the surface to degrade the clean atmosphere of factories handling ELSIs, precision electronic parts or the like,laboratories or clean rooms.

An object of the present invention is to provide an electrically conductive decorative material having an excellent conductive properties along with a decorative effect and a light-colored appearance.

Another object of the present invention is to provide an electrically conductive decorative material free of the problem of dust and like particles.

BRIEF SUMMARY OF THE INVENTION

The present invention provides an electrically conductive decorative material characterized in that the material comprises:

(a) a layer of an electrically conductive resin containing an electrically conductive fiber, and (b) a layer of collection of pattern pieces formed over the resin layer and containing an antistatic agent, the fiber-containing conductive resin penetrating into and filling the interstices between the pattern pieces.

BRIEF DESCRIPTION OF THE DRAWINGS

The present invention will be described below with reference to the accompanying drawings, in which.

DETAILED DESCRIPTION OF THE PREFERRED EMBODIMENT

Figure 1:
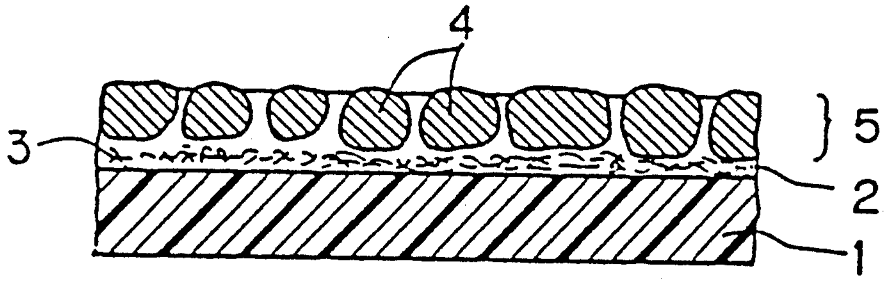
FIG.1 is a sectional view showing a decorative material of the invention.

In the drawings, 1 is an electrically conductive backing which is optionally provided, 2 is a conductive resin layer containing an electrically conductive fiber 3, 4 is a pattern piece containing an antistatic agent, 5 is a layer of collection of pattern pieces 4, 6 is an electrically conductive resin layer which penetrates into and fills the interstices between the pattern pieces 4, and 7 is a pellet containing an electrically conductive fiber.

The electrically conductive decorative material of the present invention is prepared, for example, by coating an electrically conductive backing with a thermoplastic resin 2 in the form of a paste and containing an electrically conductive fiber 3, scattering a predetermined quantity of pattern pieces 4 over the resin coating, and subjecting the resulting sheet to an increased pressure with heating preferably at 160°to 220° C. to thereby cause the thermoplastic resin 2 containing the conductive fiber 3 to penetrate into and fill the interstices between the pattern pieces 4 and form a layer 5 of collection of the pattern pieces 4.

Examples of conductive fibers for use in the present invention are carbon fiber, metal fiber, fiber of vacuum-evaporated metal and the like. These conductive fibers are preferably 0.1 to 10 mm, more preferably 0.5 to 5 mm, in average length and preferably 5 to 50 $\mu$m, more preferably 10 to 20 $\mu$m, in average diameter. The thermoplastic resin serving as a matrix resin for the conductive fiber is, for example, polyvinyl chloride (PVC) or copolymer thereof, ethylene-vinyl acetate copolymer (EVA), polyethylene (PE), polypropylene (PP), amorphous poly $\alpha$-olefin (APAO) or the like. The matrix resin contains the conductive fiber preferably in an amount of 0.5 to 5 wt %. Pellets 7 containing an electrically conductive fiber can be incorporated into the conductive resin layer along with the conductive fiber.

These pellets can be obtained by incorporating the same conductive fiber as mentioned above into pellets of a resin similar to the matrix resin for the fiber. It is further possible to incorporate into pellets a plasticizer, stabilizer, pigment, etc. The components other than an electrically conductive fiber are stirred in a mixer to prepare a resin paste. Then the electrically conductive fiber is added gradually to the paste and the mixture is stirred to obtain a paste having the electrically conductive fiber uniformly dispersed therein. The resulting paste is spread over a release paper in a thickness of about 1 to 3 mm, preferably about 1.5 to 2.5 mm. The coated paste is heated to gel to obtain a sheet. The sheet is cooled and then pulverized to a mean particle size of about 1 to 5 mm to obtain conductive pellets. The presence of pellets gives improved conductivity to the material. Such pellets are used preferably in a quantity of 1 to 10 wt% based on the matrix resin.

The conductive backing to be used in the invention is preferably a sheet or the like which is prepared, for example, from the same matrix resin as above and electrically conductive carbon black kneaded therewith. When the backing 1 is not provided, it is desirable to form the conductive resin layer over release paper or the like. The conductive resin containing the conductive fiber is applied to the backing 1 or release paper to a thickness preferably 0.1 to 2 mm, more preferably 0.2 to 0.7 mm.

According to the present invention, the conductive resin layer has formed thereon the layer 5 of collection of pattern pieces 4 prepared from a thermoplastic resin which contains no conductive fiber and is given an antistatic property by an antistatic agent. The thermoplastic resin serving as a matrix resin for the antistatic agent can be the same as the matrix resin for the conductive fiber.

The antistatic agent to be used in the invention is, for example, any of various surfactants, which include, for example, anionic, nonionic, cationic and ampholytic surfactants as given below.

Anionic surfactants

Higher alcohol-sulfuric acid ester salts, alkylbenzenesulfonic acid salts, alkylnaphthalenesulfonic acid salts, phosphoric acid ester salts, fatty acid ethylsulfonic acid salts and fatty acid salts.

Cationic surfactants

Alkylamine salts, polyoxyethylene alkylamine salts and quaternary ammonium salts.

Nonionic surfactants

Partial esters of fatty acid with polyvalent alcohols, polyoxyethylene alkyl ethers, polyoxyethylene alkyl phenyl ethers, polyoxyethylene acyl esters, polyethylene glycols and polyoxyethylene alkylamines.

Ampholytic surfactants

Alkylbetaines and imidazoline sulfuric acid esters.

When required, surfactants can be used in combination with an electrically conductive plasticizers of the phosphoric acid ester type, such as cresyldiphenyl phosphate, tricresyl phosphate, dioctyl phosphate, triamyl phosphate, 2-butoxyethyl phosphate and 2-chloroethyl phosphate. The antistatic agent is used preferably in an amount of 1 to 5 wt% based on the matrix resin. Preferably, the pattern pieces 4 are 0.5 to 5 mm in diameter.

According to the present invention, the conductive resin layer 1 having pattern pieces 4 arranged thereon is pressed with heating to thereby cause the conductive resin to penetrate into and fill the interstices between the pattern pieces 4, whereby the contemplated conductive decorative material can be formed. Consequently, the conductive fiber 3 is partly present in the penetrating resin portions 6 to give greatly improved conductivity to the material vertically thereof. Moreover, the conductive fiber, which is present in the above-mentioned amount, is difficult to recognize with the unaided eye, so that the material appears to contain no conductive fiber, has nothing which impairs its decorative appearance and can be colored light as desired. Accordingly, it is not likely that the material is solid black or only dark-colored like the conventional conductive floor material, but the present material is available with an optional design. Additionally, the pieces of conductive fiber which are virtually difficult to recognize with the unaided eye are dispersed as entangled with one another in the thermoplastic resin and electrically connected to the conductive backing. This gives very satisfactory conductivity to the decorative material, facilitating release of charge from the material itself or from the human body in contact with the material. Thus, the decorative material has remarkable conductivity in its entirety.

Figure 2:
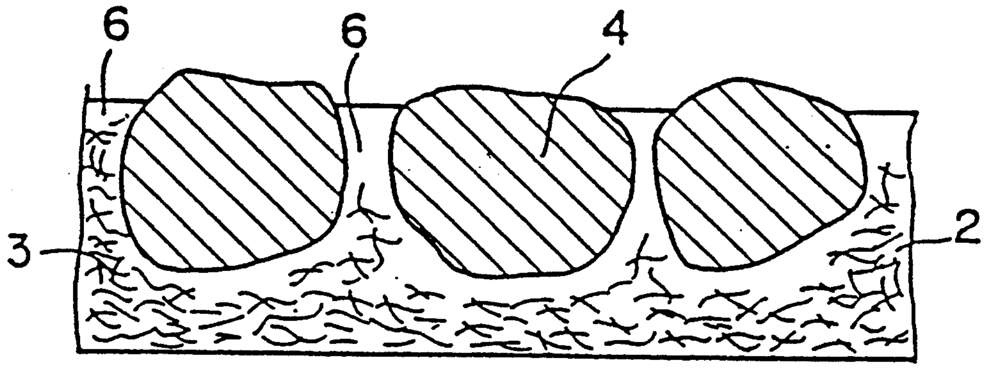
FIG.2 is a fragmentary enlarged view of the surface layer of the material.
Figure 3:
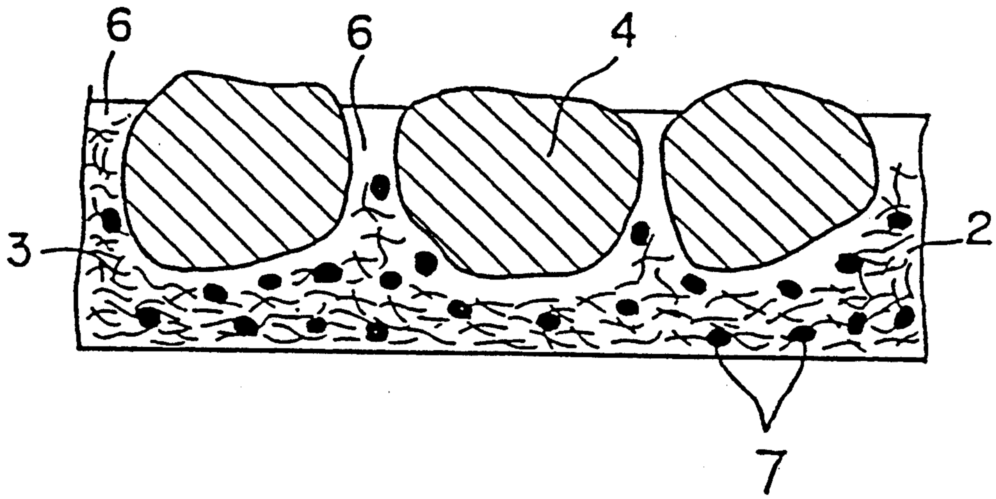
FIG.3 is a fragmentary enlarged view of a surface layer having arranged therein pellets containing an electrically conductive fiber.
Figure 4:
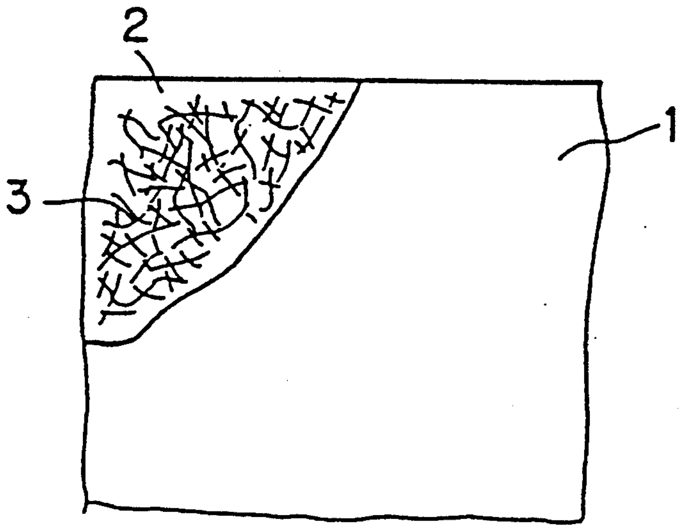
FIG.4 is a rear view of the decorative material of the invention.

According to the invention, the pieces of conductive fiber are spread in the conductive resin layer as entangled with one another horizontally as shown in FIG. 1 and as entangled also vertically as seen in FIG. 2. The conductive fiber thus entangled three-dimensionally effectively affords electric conductivity.

Generally in factories handling electronic parts, operating rooms of hospitals, etc., the charge voltage on the human body due to walking on the floor material is up to 50 V, preferably up to 30 V, whereas the corresponding value in the case of the present decorative material is surprisingly as low as up to 20 V. The present material is therefore useful as a floor material for completely eliminating voltage breakdown failures in factories handling ICs, LSIs or the like, ignition due to the discharge of charge on the human body in operating rooms, and malfunctions or like troubles of electronic devices.

With the conventional conductive floor material, a large amount of carbon black or conductive fiber is exposed on the surface and accordingly releases fine carbon or like particles, so that the material is not usable in clean rooms or the like, whereas with the decorative material of the invention, the conductive fiber appears on the surface only to such an extent that it is virtually difficult to recognize with the unaided eye. Thus, the present material releases almost no dust even in clean rooms and is usable favorably.

The conductive decorative material of the present invention have the following advantages.

1. The pattern pieces of thermoplastic resin made antistatic by an antistatic agent can be colored as desired, while the thermoplastic resin penetrating into the interstices between the pattern pieces can also be colored as exactly desired, and the conductive fiber incorporated therein is virtually difficult to recognize with the unaided eye. The material is therefore given both a highly light-colored appearance and electrical conductivity which can not be realized with any conventional conductive floor material.
2. With almost no carbon black or conductive fiber left exposed on the surface, there is little or no likelihood of the material releasing dust or like particles.
3. The material becomes charged to a voltage of as low as about 7 V per 10 KV as measured by the Honest Meter method, while the charge voltage on the human body on the material is also low. This eliminates the voltage breakdown of ICs, LSIs and the like or malfunctions of electronic devices.
4. The conventional antistatic treatment is generally dependent on humidity, whereas the decorative material of the invention has excellent conductive properties without depending on humidity.

5. The combination of conductive fiber and conductive pellets affords a further improved conductive effect.

The present invention will be described with reference to the following examples.

Example 1

A PVC paste of composition A was colored light blue with a toner and applied to a thickness of 0.3 mm on a conductive backing having carbon black incorporated therein. Colored antistatic pattern pieces were prepared by adding pigments to portions of a compound of composition B individually, making the paste portions into three kinds of sheets, i.e., dark blue, blue and light blue sheets, and pulverizing the sheets to a mean particle size of 2 mm. The pattern pieces were scattered over the resin layer on the backing, and the resulting sheet was heated to 200° C. and then pressed to obtain a conductive decorative floor material of the invention.

It was virtually difficult to recognize the conductive carbon fiber on the surface of the floor material with the unaided eye, and the material had a highly light-colored appearance and an excellent decorative effect.

| | |
|---|---|
| Composition A | |
| PVC (Kanevinyl paste PSL-10, product of Kanegafuchi Chemical Industry Co., Ltd.) | 100 parts |
| Filler (calcium carbonate) | 5 parts |
| Plasticizer (dioctyl phthalate) | 40 parts |
| Stabilizer (Ba—Zn type) | 2 parts |
| Carbon fiber (3 mm in average length and 13 μm in average diameter) | 3 parts |
| Composition B | |
| PVC (SS-80, product of Denki Kagaku Kogyo K.K.) | 100 parts |
| Filler (calcium carbonate) | 50 parts |
| Epoxy resin (O-130P, product of Adeka Argus Co., Ltd.) | 4 parts |
| Plasticizer (dioctyl phthalate) | 40 parts |
| Stabilizer (Ba—Zn type) | 4 parts |
| Antistatic agent (polyoxyethylene alkylamine salt) | 2 parts |

The following properties of the floor material obtained were measured at 20° C. at a relative humidity of 20%.

(1) Charge voltage on the material by the Honest Meter method (according to JIS L 1094)

(2) Charge voltage on the human body due to walking (according to JIS L 1021)

(3) Electric resistance between the ground and the surface of the material in contact with the ground by the NFPA method. Table 1 shows the result.

TABLE 1

| | |
|---|---|
| Honest Meter method | 7 V |
| Charge voltage on human body | 11 V |
| NFPA method (Ω) | |
| Electric resistance of the surface of the material in contact with the ground | $1.2 \times 10^4$ |
| Electric resistance between the ground and the surface of the material | $1.1 \times 10^4$ |

Table 1 shows that the decorative material of the invention had excellent conductive properties. No voltage breakdown of ICs, LSIs or the like, or no malfunction of electronic devices occurred due to the use of the present material.

Example 2

Into a mixer were placed and stirred 100 parts of PVC (Kanevinyl paste PSL-10), 42 parts of dioctyl phthalate, 4 parts of Ba-Zn type stabilizer and 5 parts of titanium oxide (pigment). To the mixture was added 6 parts of carbon fiber having an average length of 3 mm and average diameter of 13 μm, and the mixture was stirred to obtain a paste.

The resulting paste was spread over a release paper in a thickness of 2 mm and heated at 200° C. to obtain a gelled sheet. The sheet was cooled to room temperature and pulverized to a mean particle size of 2 mm to obtain conductive pellets.

A conductive floor material was prepared in the same manner as in Example 1 except that the above conductive pellets was incorporated in the conductive resin layer in an amount of 8 wt % based on the matrix resin.

Table 2 shows charge voltage and electric resistance of the obtained floor material.

TABLE 2

| | |
|---|---|
| Honest Meter method | 5 V |
| Charge voltage on human body | 9 V |
| NFPA method (Ω) | |
| Electric resistance of the surface of the material in contact with the ground | $1.0 \times 10^4$ |
| Electric resistance between the ground and the surface of the material | $0.9 \times 10^4$ |

We claim:

1. An electrically conductive decorative material comprising:

(a) a layer of a resin containing 0.5 to 5 weight percent of an electrically conductive fiber which renders the resin layer electrically conductive, and (b) a plurality of pattern pieces spaced apart one from another and embedded in the resin layer, the pattern pieces containing an antistatic agent, the fiber-containing conductive resin penetrating into and filling interstices between the pattern pieces, the electrically conductive decorative material having a maximum surface resistivity of $1.3 \times 10^4$ ohms at 15% relative humidity.

2. A material as defined in claim 1 further comprising an electrically conductive backing disposed on the rear surface of the resin layer.

3. A material as defined in claim 1 further comprising pellets containing an electrically conductive fiber disposed in the resin layer.

4. The electrically conductive decorative material of claim 1, wherein said material has a decorative appearance in which it is difficult to recognize said electrically conductive fiber with the unaided eye.

* * * * *